(12) United States Patent
Bernt et al.

(10) Patent No.: US 8,136,487 B2
(45) Date of Patent: Mar. 20, 2012

(54) COOLING AIR SUPPLY APPARATUS FOR AN INTERNAL COMBUSTION ENGINE HAVING AN EMERGENCY OPERATION DEVICE

(75) Inventors: Volker Bernt, Trebur (DE); Rolf Ewert, Ruesselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 6 days.

(21) Appl. No.: 12/728,022

(22) Filed: Mar. 19, 2010

(65) Prior Publication Data

US 2010/0236503 A1    Sep. 23, 2010

(30) Foreign Application Priority Data

Mar. 19, 2009   (DE) .................. 10 2009 014 003

(51) Int. Cl.
*F01P 7/02* (2006.01)
(52) U.S. Cl. .................. 123/41.05; 180/68.1
(58) Field of Classification Search .............. 123/41.04, 123/41.05, 41.06, 41.07; 192/58.61; 180/68.6, 180/68.1
See application file for complete search history.

(56) References Cited

U.S. PATENT DOCUMENTS

| | | | | |
|---|---|---|---|---|
| 4,457,558 A | * | 7/1984 | Ishikawa | 296/180.5 |
| 4,519,343 A | * | 5/1985 | Hayashi et al. | 123/41.49 |
| 4,539,944 A | * | 9/1985 | Garcea et al. | 123/41.06 |
| 5,397,267 A | | 3/1995 | Vecellio et al. | |
| 5,732,666 A | * | 3/1998 | Lee | 123/41.05 |
| 6,854,544 B2 | | 2/2005 | Vide | |
| 7,070,013 B1 | | 7/2006 | Kuebler et al. | |
| 7,503,444 B2 | * | 3/2009 | Bohan | 192/58.61 |
| 7,559,391 B2 | * | 7/2009 | Bradley et al. | 180/68.1 |

FOREIGN PATENT DOCUMENTS

| | | |
|---|---|---|
| DE | 7421585 U | 11/1974 |
| DE | 10026047 A1 | 11/2001 |
| DE | 10228422 A1 | 1/2003 |
| DE | 10306158 A1 | 8/2004 |
| DE | 102004026419 A1 | 12/2005 |
| EP | 1022195 A2 | 7/2000 |

OTHER PUBLICATIONS

German Patent Office, German Search Report for Application No. 102009014003.4, dated Feb. 18,m 2010.

* cited by examiner

*Primary Examiner* — Noah Kamen
(74) *Attorney, Agent, or Firm* — Ingrassia Fisher & Lorenz, P.C.

(57) ABSTRACT

A device is provided for the emergency operation of at least one closure element of a cooling air supply apparatus and a correspondingly implemented cooling air supply apparatus for an internal combustion engine of a motor vehicle, a closure element being mechanically operationally linked to an actuator. The closure element is situated so it is movable between a closed position, in which it essentially closes a ventilation opening, and an open position, in which it releases the ventilation opening for cooling air to flow through. The actuator automatically transfers the closure element into the open position if a predetermined temperature is exceeded.

12 Claims, 1 Drawing Sheet

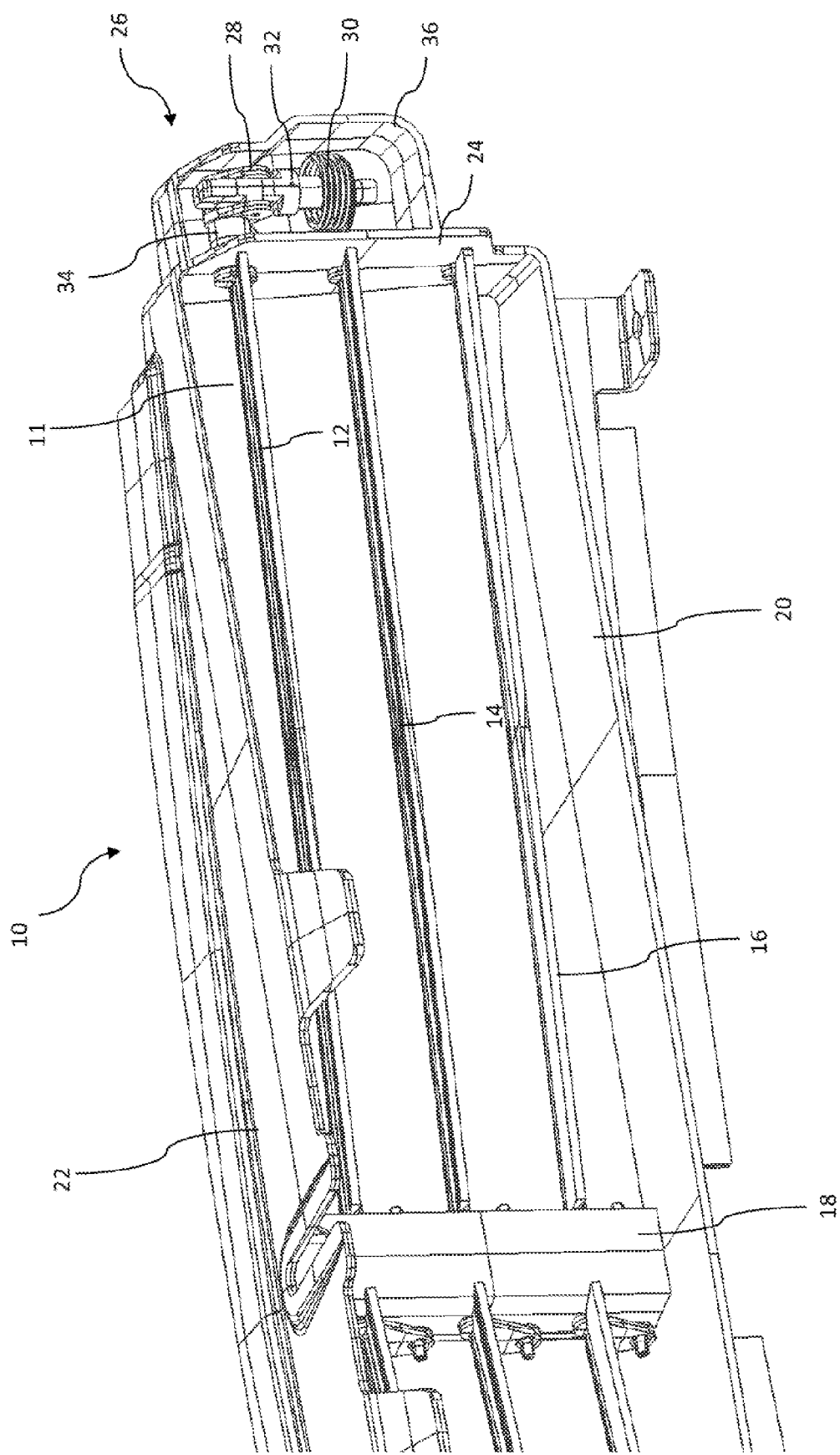

COOLING AIR SUPPLY APPARATUS FOR AN INTERNAL COMBUSTION ENGINE HAVING AN EMERGENCY OPERATION DEVICE

CROSS-REFERENCE TO RELATED APPLICATION

This application claims priority to German Patent Application No. 102009014003.4, filed Mar. 19, 2009, which is incorporated herein by reference in its entirety.

TECHNICAL FIELD

The present invention relates to a cooling air supply apparatus for the internal combustion engine of a motor vehicle, which is provided with an emergency operation device for at least one of its closure elements.

BACKGROUND

The heat generated in operation of an internal combustion engine of a motor vehicle is typically dissipated to the surroundings using a heat exchanger which can have an air stream flow through it. Such heat exchangers, which are commonly referred to as radiators, are designed so that even at maximum power development of the engine, also under extreme external conditions at external temperatures above approximately 40° C. and more, they provide sufficient cooling.

In the predominant number of motor vehicles, the radiator is situated in front of the internal combustion engine viewed in the travel direction, so that a part of the travel wind can be used directly as the cooling air to be supplied.

The air supply to the radiator occurs via air inlet openings of a radiator grille, which can have greatly varying embodiments as a component of the vehicle front depending on the vehicle design.

In the meantime, so-called active cooling air supply apparatuses have come into existence, which regulate the cooling air supply to the radiator on demand. Thus, for example, DE 102 28 422 A1 discloses a louver for closing openings having pivotable louver elements situated parallel to one another. Depending on the position and orientation of the louver elements, the cooling air supply to the heat exchanger, or to the internal combustion engine, can be regulated according to the cooling requirements. In addition, the flow-technology geometry of the vehicle changes with the adjustment of the louver elements. In the event of a closed radiator louver, the air resistance of the motor vehicle decreases, which is accompanied by an advantageous reduction of the fuel consumption.

An actuating drive driven by an electric motor is typically provided for the pivotable operation of individual louver elements, which is activated and regulated by the onboard electronics of the vehicle.

Because opening of the louver element or air supply lamellae is not required for cooling under normal operating conditions, the lamellae are predominantly located in their closed position, in order to reduce the air resistance of the vehicle. However, closed lamellae prevent the dissipation of heat in particular after the vehicle is shut down, so that critical overheating of the engine can occur.

Opening of ventilation openings which is solely actuated by an electric motor thus lacks in reliability. For example, if the power supply for the actuating mechanism is interrupted or other malfunctions of the vehicle electronics occur, opening of ventilation openings, which is required after the motor vehicle has been shut down and left, cannot be provided with sufficient reliability.

The present invention is thus based on at least one object of providing an improved cooling air supply apparatus for an internal combustion engine of a motor vehicle, which offers increased reliability for the opening of ventilation openings. The cooling air supply apparatus is also to be able to be actuated independently of the onboard electronics of the motor vehicle and is to be used for avoiding critical overheating of the internal combustion engine, in particular when the engine is shut down and the vehicle electronics are inactive. In addition, other objects, desirable features and characteristics will become apparent from the subsequent summary and detailed description, and the appended claims, taken in conjunction with the accompanying drawings and this background.

SUMMARY

The at least one object, other objects, desirable features and characteristics, on which the invention is based is achieved using a device for emergency operation and a cooling air supply apparatus. The device according to an embodiment of the invention is implemented for the emergency operation of at least one closure element of a cooling air supply apparatus, for an internal combustion engine of a motor vehicle. The cooling air supply apparatus, which typically comprises a radiator grille having a number of ventilation openings, has at least one closure element provided for emergency operation, in particular for emergency opening, which is mechanically operationally linked to an actuator of the emergency operation device.

The closure element is situated so it is movable between a closed position and an open position, it essentially closing a ventilation opening in its closed position and it releasing this ventilation opening for cooling air to flow through in the open position. The actuator which is coupled to the closure element is implemented according to an embodiment of the invention for the purpose of automatically transferring the closure element into the open position if a predetermined temperature is exceeded.

In this way, an adjustment movement for the closure element which is triggered by the actuator and initiated there from can be provided independently of the actual actuating drive of the closure element or the closure elements. The actuator of the emergency operation device can be implemented as completely autonomous and decoupled from the onboard electronics of the motor vehicle and/or from the actuating drive of the cooling air supply apparatus.

The actuator can additionally assume a double function, in that, on the one hand, it detects the occurrence of a temperature lying above a predetermined temperature level and, on the other hand, in direct reaction thereto, it initiates a mechanical adjustment movement of the closure element and generates and provides a force required for this purpose or a corresponding adjustment torque.

According to a first advantageous embodiment of the invention, the actuator is implemented as a temperature-sensitive element and is subject to a length, shape, or size change as a function of the ambient temperature. The temperature-related change of the geometry or the external contour of the actuator is transferred into the required adjustment movement for the closure element. The length, shape, or size change of the actuator then initiates and causes the adjustment movement of the closure element, in order to provide an emergency opening mechanism for the cooling air supply apparatus.

According to an advantageous refinement of the invention, the actuator is coupled to a restoring mechanism, which transfers the closure element into the closed position in the event of a temperature drop below a predetermined temperature level. The restoring mechanism can have a restoring spring, for example, which counteracts an opening movement of the closure element and which is designed to store a spring force upon transfer of the closure element into its open position.

The actuator and the restoring mechanism are adapted to one another in such a way that the force provided by the actuator in the event the predetermined temperature is exceeded is greater than the restoring force originating from the restoring mechanism.

According to a refinement of the invention, the closure element is implemented as a lamella which is mounted so it is rotatable, without restricting the invention thereto, however. Thus, for example, pivotable or translationally displaceable or movable configurations of the closure element are similarly conceivable.

According to a further advantageous embodiment of the invention, the actuator and a lamella which is mounted so it is rotatable or pivotable are connected to one another using a crank linked radially spaced apart from the rotational axis of the lamella. In this way, a translational movement which is generated by the actuator and originates there from can be converted into a rotational movement of the lamella.

The radial spacing of the linkage point of the crank to the rotational axis, or a crankshaft which is coincident with a rotational axis of the lamella, determines the transmission ratio of a linear movement originating from the actuator into a rotational movement of the lamella.

According to a further advantageous embodiment of the invention, the actuator is implemented as a bimetal spring. An actuator of this type is subject to a change of its shaping in the event of temperature variations. This temperature-induced shape change can be used according to the invention for the adjustment movement of the closure element.

According to a further embodiment of the invention, the actuator has a cylindrical receptacle for any medium which expands under the effect of heat and a piston which is situated so it is movable in the receptacle. This piston, which is situated so it is movable along the cylinder longitudinal axis, can be regionally pressed out of the cylindrical receptacle by heat-related expansion of the medium situated between piston and cylinder floor. Materials having a particularly high thermal expansion coefficient come into consideration as the heat-sensitive medium.

Materials which are subject to a change of their aggregate state in the range of the temperature provided for the emergency opening may also be used. Furthermore, a so-called expanding material, such as a wax, can be used as the thermal medium. Thus, an adjustment movement of the actuator which is required for the operation of the closure element can be generated by heat-related melting of the wax. Furthermore, it is advantageous if the volume of the medium situated in the cylinder changes suddenly when the predetermined temperature is exceeded and temperature variations outside this predetermined temperature range result in a comparatively slight volume change of the medium. Such a sudden change of the volume can be achieved in particular in the event of an aggregate state change of the medium, in particular from solid to liquid or from liquid to gaseous.

According to a further embodiment of the invention, the actuator is in thermal contact with the engine of the motor vehicle. Thus, for example, the actuator can be situated directly on the engine and coupled to the closure element to be actuated via a traction-compression means, for example, in the form of a rod or an actuating pull.

Furthermore, the actuator can be situated inside a housing, which is directly connected to the engine or is in thermal contact therewith while situated thereon.

According to an alternative embodiment of the invention, the actuator can be activated using an electrical auxiliary drive, which is powered by a power supply decoupled from the motor vehicle electronics. For example, an auxiliary battery, which is situated in the immediate surroundings of the auxiliary drive, is associated with such an auxiliary drive. Furthermore, this auxiliary battery and the auxiliary drive can be situated in a common housing, optionally coupled to a temperature sensor, in order to provide a structural module provided for the emergency opening of a ventilation opening, which is decoupled from the remaining motor vehicle electronics and the power supply thereof.

According to a further independent aspect, the invention relates to a cooling air supply apparatus for the internal combustion engine of a motor vehicle having a number of closure elements which can be actuated, at least one of which is equipped with a previously described device for emergency operation. The closure elements may be implemented as lamellae which are situated parallel to one another and are mounted so they are rotatable or pivotable, for example, and which regulate the cooling air supply to the radiator lying behind them using an actuating drive provided for this purpose, depending on the required cooling.

The closure elements are particularly coupled to a common actuating drive for the alternate opening and closing of corresponding ventilation openings.

The at least one closure element provided for the emergency operation can be decoupled from the remaining closure elements, which are operationally linked to the actual actuating drive. Therefore, this closure element, which is provided with the emergency operation device, exclusively opens upon occurrence of a critical heat development which is above a predetermined temperature. In normal operation of the vehicle, it remains in a closed state.

According to a refinement, the closure element which is operationally linked to the device for emergency operation can also be coupled via a load-limiting clutch, such as a slip clutch, to the actuating drive of the remaining closure elements. In normal operation, the closure element is particularly operated by the actuating drive, and upon occurrence of a critical temperature, the adjustment movement of the closure element is taken over by the emergency operation device and the actuator thereof.

BRIEF DESCRIPTION OF THE DRAWINGS

The present invention will hereinafter be described in conjunction with the following drawing figure, where:

The figure shows a perspective illustration in partial section of a cooling air supply apparatus having an emergency operation device.

DETAILED DESCRIPTION

The following detailed description is merely exemplary in nature and is not intended to limit application and uses. Furthermore, there is no intention to be bound by any theory presented in the preceding background or summary or the following detailed description.

The cooling air supply apparatus 10, which is shown in detail in the figure has a frame-like support structure having an upper frame part 22, a lower frame part 20, a centrally situated vertical web 18, and a lateral frame part 24. The cooling air supply apparatus is typically implemented as a radiator grille for a motor vehicle and has multiple lamellar closure elements 12, 14, 16, which are situated parallel to one another and extend between the web 18 and the side part 24.

The lamellae 12, 14, 16 are shown in their open position in the figure. A ventilation opening 11 which is delimited by the frame 20, 22, 24 can be closed to reduce the air resistance of the motor vehicle by pivoting or rotating individual or all lamellae 12, 14, 16 by approximately 90°.

The lamellae 12, 14, 16, which are mounted so they are rotatable, are coupled to a an actuating drive (not shown explicitly), which regulates the cooling air supply by rotating or pivoting the lamellae 12, 14, 16 in operation of the vehicle as a function of the cooling to be provided, or the required heat dissipation.

In the present exemplary embodiment, solely the upper lamella 12 is equipped with an emergency operation device 26, which, upon the occurrence of an ambient or engine temperature lying above a predetermined critical temperature, transfers at least the lamella 12 into its open position shown in The figure independently of the actual actuating drive, so that in particular the thermal energy existing or arising after the engine is shut down and the corresponding heated air can escape from the engine compartment of the motor vehicle.

The emergency operation device 26 is situated in a housing 36, which is partially shown in section in the figure directly adjoining the outer side of the side part 24. The emergency operation device 26 has an actuator 32 situated inside the housing 36, which is coupled via a crank drive 28 to the rotational axis of the lamella 12. In a manner of speaking, the rotational axis of the lamella 12 penetrates the side part 24 and is engaged with a crankshaft 34 there, so that a linear upward movement of the actuator 32, or a piston situated so it is displaceable therein, results in a rotational movement of the lamella 12. The crankshaft 34 lying outside the support structure 18, 20, 22, 24 is coincident with an axial extension of the rotational axis of the lamella 12.

In addition, a restoring spring 30 is provided, which is implemented to counteract the extension movement of the actuator 32, which is directed upward in the figure.

The actuator 32 has a cylindrical receptacle, which is filled with a thermal medium and in which a piston is additionally guided so it is displaceable along the cylinder longitudinal axis. As soon as the medium, which is preferably implemented as wax, is subject to a heat-related volume enlargement, the piston is pushed upward out of the receptacle. This displacement movement of the piston is converted via the crank drive 28 and the crankshaft 34 into a corresponding rotational movement of the lamella to open the ventilation opening 11.

As soon as the temperature falls below a predetermined temperature level again, for example, through thermal convection and through the outflow of heated air, the piston moves back downward into the receptacle again because of the temperature-related volume decrease of the thermal medium. This reversing movement is supported by the spring element 30.

The cooling air supply apparatus and its emergency operation device thus provide operation of a closure element of a ventilation opening which is purely temperature-controlled and optionally reversible.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for emergency operation of a closure element of a cooling air supply apparatus for an internal combustion engine of a motor vehicle, comprising:
    an actuator that is mechanically operationally linked to the closure element; and
    a ventilation opening that is essentially closed by the closure element when the closure element is in a closed position and cooling air flows through the ventilation opening when the closure element is in an open position,
    wherein the actuator is configured to automatically place the closure element into the open position if a predetermined temperature is exceeded and is coupled to a restoring mechanism that transfers the closure element into the closed position if there is a temperature drop below a predetermined temperature level, the actuator being separate and distinct device from the restoring mechanism.

2. The device according to claim 1, wherein the actuator is a temperature-sensitive element and subject to a change that causes movement for the closure element as a function of an ambient temperature.

3. The device according to claim 1, wherein the closure element is implemented as a lamella that is configured to rotate.

4. The device according to claim 3, wherein the actuator and the lamella are coupled to a crank that is linked and spaced apart from a rotational axis of the lamella.

5. The device according to claim 1, wherein the actuator is implemented as a bimetal spring.

6. The device according to claim 1, wherein the actuator has a cylindrical receptacle configured to contain a medium that expands under an effect of heat, and a piston configured to move along a longitudinal axis, the medium being arranged to at least partially press the piston out of a receptacle under the effect of heat.

7. The device according to claim 1, wherein the actuator is in thermal contact with the internal combustion engine of the motor vehicle.

8. The device according to claim 1, wherein the actuator is activated by an electrical auxiliary drive that is powered by a power supply decoupled from electronics of the motor vehicle.

9. A cooling air supply apparatus for an internal combustion engine of a motor vehicle; comprising:
    a first operable closure element; and
    a second operable closure element, the second operable closure element comprising:
        an actuator that is mechanically operationally linked to the second operable closure element; and
        a second ventilation opening that is essentially closed by the second operable closure element when the second operable closure element is in a closed position and cooling air flows through the second ventilation opening when the second operable closure element is in an open position,
    wherein the actuator is configured to automatically transfer the second operable closure element into the open position when a predetermined temperature is exceeded and is coupled to a restoring mechanism that transfers the closure element into the closed position if there is a temperature drop below a predetermined temperature level, the actuator being separate and distinct device from the restoring mechanism.

10. The cooling air supply apparatus according to claim 9, wherein the first operable closure element and the second operable closure element are coupled to a common actuating drive, the common actuating drive configured to alternate opening and closing of a first ventilation opening and the second ventilation opening.

11. The cooling air supply apparatus according to claim 9, wherein the first operable closure element is operationally linked for emergency operation and decoupled from the common actuating drive.

12. The cooling air supply apparatus according to claim 9, wherein the first operable closure element is operationally linked for emergency operation and coupled by a load-limiting slip clutch to the actuator.

* * * * *